July 12, 1955  J. A. COLLINS  2,713,157
FAULT DETECTING AND INDICATING SYSTEM
Filed April 29, 1952  2 Sheets-Sheet 1
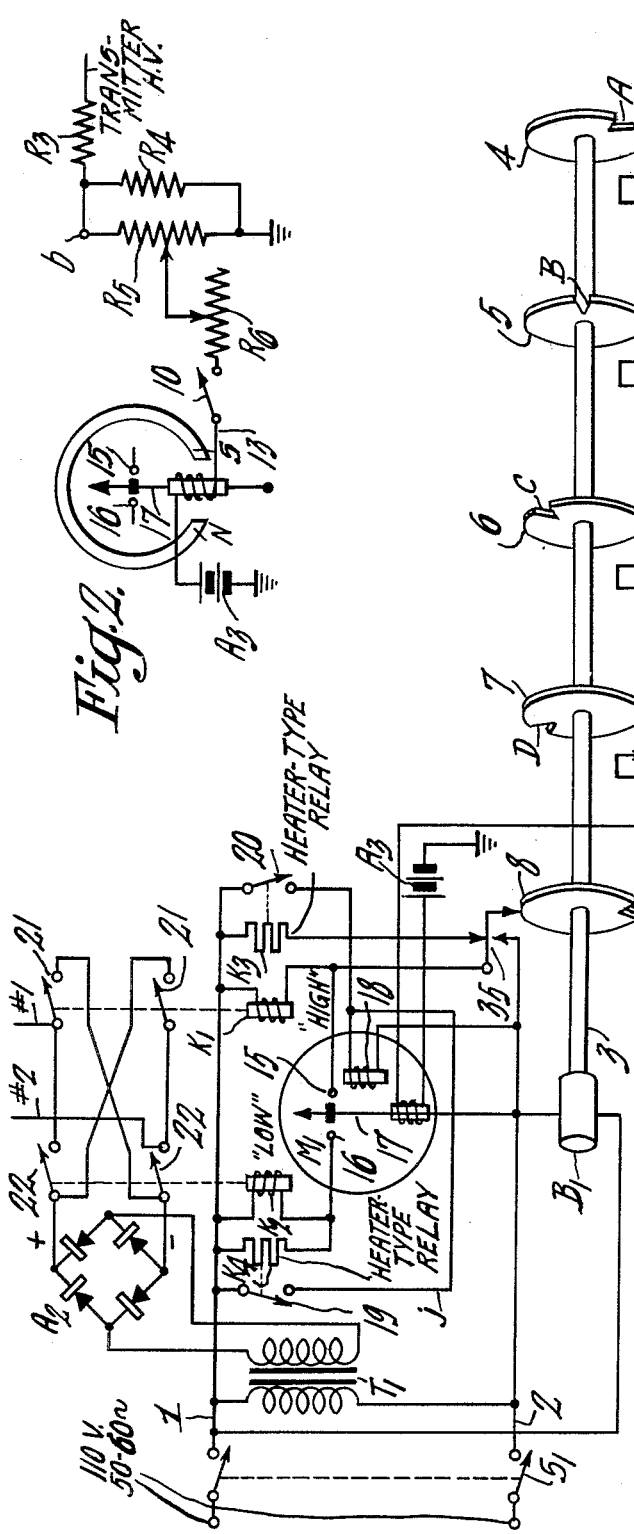
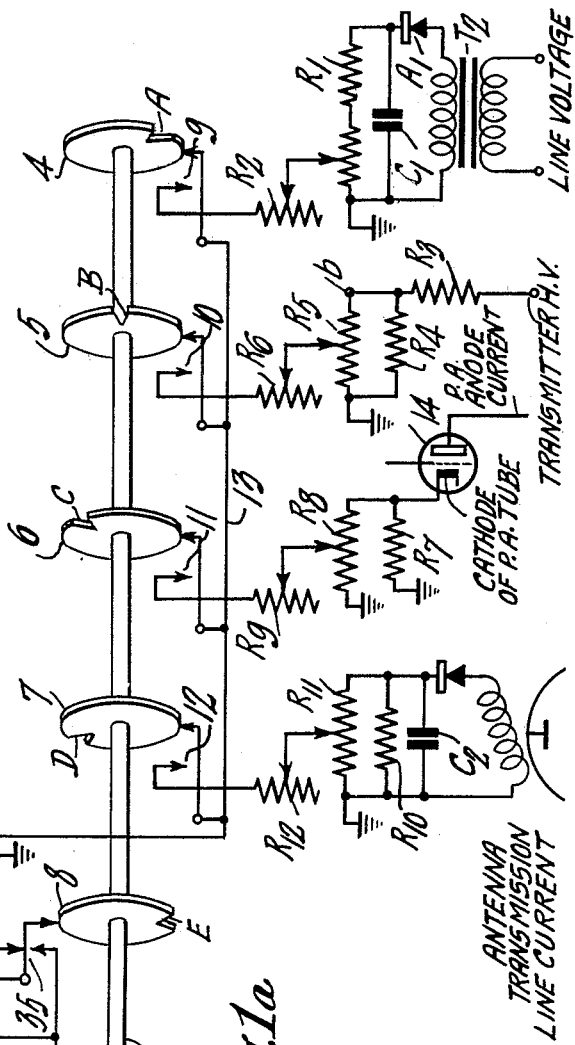
*Fig.2.*
*Fig.1a*
INVENTOR.
John A. Collins
BY Charles H. Brown
ATTORNEY

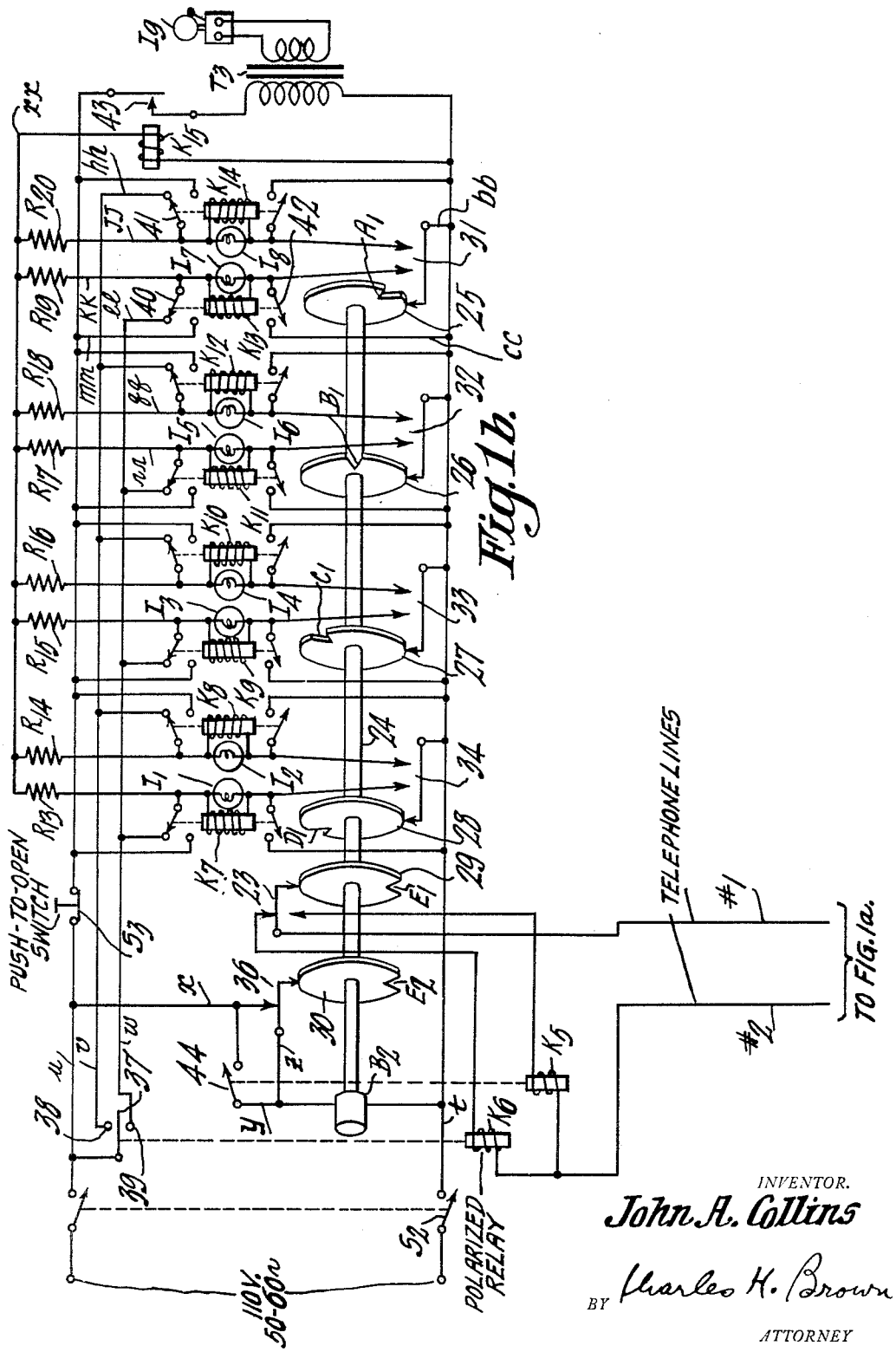

United States Patent Office 2,713,157
Patented July 12, 1955

2,713,157

FAULT DETECTING AND INDICATING SYSTEM

John A. Collins, Valois, Quebec, Canada, assignor to Radio Corporation of America, a corporation of Delaware Application April 29, 1952, Serial No. 284,999

4 Claims. (Cl. 340—213)

This invention relates to a fault detecting and indicating system, and more particularly to a system for reporting deviations from normal of one or more electrical circuits located at a certain point, to a distant point, and for indicating such deviations at the distant point.

The system of this invention has particular utility in connection with unattended operation of radio transmitters and for that reason will be described in connection therewith. However, the present system may have utility in any situation where fault indications are desired at a location separated from the location of the circuit or circuits to be checked.

It is quite often desirable to operate certain radio transmitters, such as ordinary commercial broadcast transmitters, unattended. When this is done, however, provision must be made for checking the performance of electrical circuits or electrical equipment at the unattended transmitter and for providing an indication of any abnormal condition of such circuits or equipment at a remote, attended location. Such provision must be made to assure proper continuity of operation of the transmitter.

Therefore, an object of this invention is to provide a novel fault detecting and indicating system for radio transmitters.

A more specific object is to provide a novel, effective system for sampling a plurality of electrical circuits at one location and for indicating, at a remote location, any deviation or deviations from normal of one or more of such circuits.

Another object is to provide a circuit sampling and indicating system in which a plurality of electrical circuits are successively sampled by means of a voltage comparator circuit and in which indications are provided on a light annunciator panel, at a remote point, of any abnormality in the condition of one or more of such sampled circuits.

The objects of this invention are accomplished, briefly, in the following manner: At the unattended station, a motor-driven cam switching arrangement successively connects the circuits to be sampled into a voltage comparator circuit, in which the voltage of the sampled circuit is compared to a fixed reference voltage. When the sampled-circuit voltage is sufficiently higher or lower (i. e., beyond the tolerance permitted) than the reference voltage, a D.-C. voltage of appropriate polarity (the polarities being opposite for "high" and "low" conditions) is applied across a pair of conductors extending to a remote indicating station. At the attended indicating station, another motor-driven cam switching arrangement successively partially connects separate pairs of indicating lamps (one for "high" and for "low") to a power source; if the D.-C. voltage from the unattended station so calls for it, the circuit to the proper "high" or "low" indicating lamp is completed to light such lamp and also to sound a buzzer. The motors at the unattended (transmitting) station and at the attended (indicating) station are maintained in synchronism or in step by means of synchronizing pulses transmitted periodically from the transmitter site to the remote indicating site.

The foregoing and other objects of the invention will be best understood from the following description of an exemplification thereof, reference being had to the accompanying drawings, wherein:

Figs. 1a and 1b, taken together, constitute a schematic diagram of a fault detecting and indicating system according to this invention; and Fig. 2 is a simplified schematic diagram of the voltage comparator circuit utilized in the system of this invention.

Referring to the drawings, Fig. 1a and Fig. 1b together represent schematically a system according to this invention. Fig. 1a represents the fault locating or sampling arrangement at the location where there is electrical equipment which may be unattended. It is desired to continually check the condition of each of a plurality of circuits at this location and to report any deviations from normal as "low" or "high" on a light annunciator panel at a remote, attended location. Fig. 1b represents the fault indicating arrangement at the location remote from the electrical equipment which it is desired to check.

Reference will first be made to Fig. 1a. In checking the performance or condition of broadcast transmitters according to this invention, four circuits of the transmitter are sampled, to wit, line voltage, anode high voltage, power amplifier anode current and antenna transmission line current. In the system to be described, each of these four circuits is sampled for a period of about four seconds, once every 90 seconds. The sampling is effected by switching each of the four circuits in succession into a voltage comparator circuit, to be referred to in more detail in connection with Fig. 2. The switching is accomplished by a synchronous timing motor $B_1$ which drives a timing shaft 3 to which are secured five cams 4, 5, 6, 7 and 8. There is a notch in each of these cams, the notches in cams 4, 5, 6, 7 and 8 being denoted by A, B, C, D and E, respectively. Each notch permits the actuating lever of a microswitch or snap-action switch, which lever cooperates with a corresponding cam, to fall into the notch and operate the switch. Switch 9 is operated by notch A, switch 10 by notch B, switch 11 by notch C, switch 12 by notch D and switch 35 by notch E. Although the actuating lever of switch 35 is shown as being on the opposite side of shaft 3 from the levers of switches 9—12, this has been done only for convenience in illustration. Actually, to make the system of this invention work properly, the actuating levers of all the switches 9, 10, 11, 12 and 35 should be on the same side of shaft 3. Switches 9—12 are associated with the four circuits it is desired to sample and are normally open, being closed when the respective actuating levers fall into the associated notches. Each such switch when closed connects the corresponding circuit it is desired to sample to a voltage comparator circuit. The circumferential length of each of notches A—D is such that, when considered in connection with the speed of rotation of shaft 3, the duration of the sampling (i. e., the time when the switches are closed) is four seconds. Also, notch E has a time-length of four seconds. The timing motor $B_1$ has a shaft 3 speed of ⅔ R. P. M. or one revolution every 90 seconds.

Synchronous timing motor $B_1$ is energized from the A. C. supply leads 1 and 2, when the double pole single throw switch $S_1$ is closed, through an obvious circuit, to drive shaft 3 and cams 4—8. Notches A, B, C and D are so angularly related with respect to each other and the direction of rotation of shaft 3 is such, that respective switches 9, 10, 11 and 12 are closed in that order.

Switch 9 (notch A) effects the sampling of the line voltage through a transformer $T_2$ to the primary of which the line voltage is applied and to the secondary of which a rectifying-and-smoothing circuit consisting of a rectifier $A_1$ and a capacitor $C_1$ is connected. A point in this circuit is selected where there is a D.-C. voltage of 3 volts, when the line voltage is normal. For this purpose, a potentiometric arrangement including resistors $R_1$ and $R_2$, and the two movable taps, is connected as indicated, one end of resistor $R_2$ being connected to one contact of switch 9 so as to connect the selected circuit point (when switch 9 is closed) to the lead 13 which is common to the actuating lever of switches 9—12 and which goes to the voltage comparator circuit. When the line voltage is normal, the D.-C. voltage to ground at said one end of resistor $R_2$ is 3 volts.

Switch 10 (notch B) effects the sampling of the high anode voltage (transmitter high voltage), which may have a nominal value of 2500 volts D. C. The high voltage is dropped by means of a voltage divider $R_3$, $R_4$ across the high voltage source so that the voltage appearing at point "$b$" is 6 volts D. C. Resistors $R_3$ and $R_4$ are of such value that the current drain through them is only two milliamperes, which is not enough to affect the transmitter operation. A potentiometric arrangement including resistors $R_5$ and $R_6$ is connected as indicated, one end of resistor $R_6$ being connected to one contact of switch 10 so as to connect the second circuit to be sampled (when switch 10 is closed) to lead 13. The arm of the potentiometer $R_5$ is set at a position which gives a D.-C. voltage to ground, at said one end of resistor $R_6$, of 3 volts when the high anode voltage is normal.

Switch 11 (notch C) effects the sampling of the power amplifier anode current. Across a cathode resistor $R_7$ of the power amplifier tube 14 (through which resistor power amplifier anode current flows) a potentiometric arrangement including resistors $R_8$ and $R_9$ is connected as indicated, one end of resistor $R_9$ being connected to one contact of switch 11 so as to connect the third circuit to be sampled (when switch 11 is closed) to lead 13. The arm of the potentiometer $R_8$ is set at a position which gives a D.-C. voltage to ground of 3 volts at said one end of resistor $R_9$ when the power amplifier anode current (the flow of which through resistors $R_7$ and $R_8$ produces a voltage drop across these resistors) is normal.

Switch 12 (notch D) effects the sampling of the antenna transmission line current through a rectifying arrangement coupled to said line and including a rectifying diode and a parallel-connected resistor-capacitor load consisting of capacitor $C_2$ and resistor $R_{10}$. Across the arrangement $C_2$, $R_{10}$ (across which a voltage proportional to antenna transmission line current is produced) a potentiometric arrangement including resistors $R_{11}$ and $R_{12}$ is connected as indicated, one end of resistor $R_{12}$ being connected to one contact of switch 12 so as to connect the fourth circuit to be sampled (when switch 12 is closed) to lead 13. The arm of the potentiometer $R_{11}$ is set at the position which gives a D.-C. voltage to ground of 3 volts at said one end of resistor $R_{12}$ when the antenna transmission line current is normal.

The reference D.-C. voltage which is used to check the performance of the four transmitter circuits is 3 volts, which may be obtained from two #6 dry cells $A_3$. It will be recalled that, at the point selected in each of the transmitter circuits for connection to the voltage comparator circuit, there is a D.-C. voltage of 3 volts when each transmitter circuit is operating normally.

The device which is the heart of the voltage comparator, and which detects whether the sampled transmitter circuit voltage is reading "high" or "low" from its normal value, is a zero-center microammeter $M_1$ having a range of 20 microamperes on each side of the center. Such instruments are widely used in the electrical power field and are generally termed "marginal relays." The indicator of this instrument is normally in the middle or zero position. The instrument has contacts 15 and 16, one on each side of the indicating needle 17. When the needle moves to either side and touches one of these contacts, an electrical circuit is completed from the needle to the contact. To insure that good contact is made, the contacts 15 and 16 are magnetized, so that once the needle touches either contact it is firmly held in that position. Re-centering of the needle is effected by energizing a solenoid 18 within the meter, from the 110-volt A. C. source. The energizing of this solenoid brings together two small arms, mounted one on either side of the needle, thus effecting the recentering operation.

Reference to Figure 2, which is a simplified schematic diagram of the voltage comparator circuit drawn with particular relation to the second transmitter circuit (the transmitter anode high voltage), will make clearer the operation of such comparator circuit. When the cam-operated switch 10 is closed (by notch B), the voltage between the arm of potentiometer $R_5$ and ground is applied to the operating solenoid of meter $M_1$, in series opposition to the reference D. C. voltage (3 volts) supplied by battery $A_3$, one terminal of which is grounded. The resistance of the meter used in a particular arrangement according to the invention was such that with resistor $R_6$ set at zero resistance, a plus or minus deviation of 2% in the normal voltage value of the anode high voltage circuit would cause the needle 17 of the meter to swing to either the "low" or "high" contact. It may be seen that the voltage of battery $A_3$ is compared to the voltage supplied from the arm on potentiometer $R_5$ when switch 10 is closed, since these two voltages are then applied in series opposition to the operating winding of meter $M_1$. When the sampled circuit voltage (from $R_5$) is sufficiently higher or lower than the reference battery voltage (from $A_3$), the needle 17 of meter $M_1$ swings to the appropriate "high" contact 15 or "low" contact 16. As motor $B_1$ rotates shaft 3, switches 9, 10, 11 and 12 are closed successively, to successively compare the voltages from the four transmitter circuits being checked to the reference battery voltage, the action being similar to that just described for switch 10 and the second transmitter circuit. When any of the sampled transmitter circuit voltages are sufficiently higher or lower than the reference battery voltage, the needle 17 will swing to the appropriate "high" or "low" contact. Continuing with the example, the current through the meter coil with $R_6$ set at zero resistance would be 20 microamperes for 2% deviation from normal. A tolerance setting of 2% with $R_6=0$ means that the initiating voltage is $$(3.00-.98 \times 3.00) \text{ v.} = +0.06 \text{ v.}$$

or $(3.00-1.02 \times 3.00)$ v.$=-0.06$ v. The meter current is either plus or minus 20 microamperes. The meter resistance is then $$\frac{.06}{20 \times 10^{-6}} = 3,000 \text{ ohms}$$

When a tolerance setting of plus or minus 20% is required, then the initiating voltage is plus 0.6 volt or minus 0.6 volt and the total resistance in the meter circuit woud have to be 30,000 ohms or the series resistance $R_6$ would have to be 27,000 ohms.

The 20-microampere current flowing through the meter $M_1$ and to or from the battery $A_3$ is of such low magnitude that the terminal voltage of the battery is not appreciably lowered. Thus, the low meter current permits the battery to serve as a reliable voltage standard. This is especially true when all the transmitter circuits are operating normally since there is then no meter movement when the circuits are sampled and thus no battery drain whatever. Besides, even when a transmitter circuit is abnormal or beyond the tolerance limits, the sampling period lasts only for 4 seconds every 90 seconds, so the battery drain is minimized in time duration.

We will now return to Fig. 1a. Once the sampling of a circuit which is abnormal or out of tolerance has been completed, the recentering solenoid 18 is energized momentarily, centering the needle 17 to prepare it for the next sampling. This action will now be described in detail. The recentering solenoid 18 is a part of meter $M_1$, the other coil of this meter being of course the 20-microampere operating coil for needle 17. When one of the four transmitter circuits being sampled drops from its normal value to such an extent that (when connected through its respective cam-operated switch to the meter operating coil) it moves needle 17 to the "low" contact 16, the winding of relay $K_2$ is energized from the alternating current source through needle 17 and contact 16, since needle 17 is connected to alternating current lead 2. Also, the winding of relay $K_4$, which is in parallel with that of relay $K_2$, will be energized. Relay $K_4$ is a heater-type relay (akin to a thermally-operated switch provided with a heater winding) the normally-open contacts 19 of which close two seconds after 110 volts is applied to the heater winding. Contacts 19 remain closed for three seconds after the voltage is removed from the heater winding. Two seconds after needle 17 engages contact 16 (thereby energizing the winding of relay $K_4$), contacts 19 close and a circuit is completed from 110 volt bus 1, through contacts 19, wire $j$ and recentering solenoid 18, to the other 110 volt bus 2. This energizes the recentering solenoid, keeping it energized as long as contacts 19 are closed. Energization of solenoid 18 recenters needle 17 and holds it in the center position for as long as solenoid 18 is energized, even though during a part of this time of energization of solenoid 18 the abnormal sampled circuit is connected to the operating coil of meter $M_1$.

Recentering of needle 17 by the initial energization of solenoid 18 opens the energization circuit to the windings of relays $K_2$ and $K_4$. Thus, when needle 17 moves to the "low" magnetic contact 16, relay $K_2$ is energized for only two seconds (the initial or energization-time delay of relay $K_4$). Three seconds after relay $K_4$ is deenergized (the deenergization-time delay of this relay), contacts 19 open, stopping the recentering operation by opening the energization circuit to solenoid 18. It may be seen that the recentering solenoid 18 is energized for a period of three seconds (the deenergization-time delay of relay $K_4$, the winding of which is deenergized when solenoid 18 is energized to recenter needle 17) when a fault occurs, and the recentering operation is stopped five seconds (two seconds, the energization-time delay of relay $K_4$, plus three seconds, the deenergization-time delay of relay $K_4$) after the fault is first realized in the voltage comparator circuit. At the end of this five-second period, the respective microswitch actuating arm is out of the four-second notch in its coacting cam 4, 5, 6 or 7, so that the respective sampled voltage is disconnected from the operating coil of meter $M_1$; the needle or arm 17 of meter $M_1$ then rests in the center position (having been recentered by the action of solenoid 18, described), ready for the next fault.

Relay $K_3$, which with its contacts 20 brings about the recentering of arm 17 when this arm moves to the "high" position (contact 15), operates in the same way as relay $K_4$, previously described. Relays $K_3$ and $K_4$ are of exactly the same type and operate similarly. In the case of relay $K_3$, the filament or heater winding thereof is connected in parallel with the coil of relay $K_1$ by way of the normally-closed contacts of a microswitch 35 the actuating arm of which rides on cam 8. This latter microswitch comprises a single-pole double-throw switch one "throw" of which is normally closed and the other "throw" of which is normally open, the conditions of these two "throws" being reversed only when the switch actuating arm drops into notch E on cam 8.

It may be understood, from the foregoing description, that when a fault occurs and the faulty circuit is sampled, the arm 17 of meter $M_1$ will be held against either the "high" contact 15 or the "low" contact 16 for a period of two seconds, since it is two seconds between the time the winding of relay $K_3$ or of $K_4$ is energized and the time that contacts 20 or 19 are closed to effect the recentering operation. In other words, the winding of relay $K_1$ or of relay $K_2$ is energized for two seconds each time a fault occurs and each time the faulty circuit is sampled. When needle 17 moves to the "high" contact 15 and makes contact therewith, the winding of a relay $K_1$ is energized from the alternating current source through a circuit which may be traced as follows: bus 2, needle 17, contact 15, winding of $K_1$, bus 1. This closes the normally-open contacts 21 of this relay. By means of a transformer $T_1$ the primary winding of which is connected to the buses 1 and 2, a full wave bridge rectifier circuit $A_2$ employing copper oxide disc rectifiers provides a D. C. voltage source having the polarities indicated. When contacts 21 are closed, a circuit is completed from the positive terminal of rectifier circuit $A_2$ to telephone line No. 2 and another circuit is completed from the negative terminal of circuit $A_2$ to telephone line No. 1. This applies a positive D. C. voltage to line No. 2 and a negative voltage to line No. 1.

When needle 17 moves to the "low" contact 16 and makes contact therewith, the winding of a relay $K_2$ is energized from the alternating current source through a circuit as follows: bus 2, needle 17, contact 16, winding of $K_2$, bus 1. This closes the normally-open contacts 22 of this relay. When contacts 22 are closed, a circuit is completed from the positive terminal of rectifier circuit $A_2$ to telephone line No. 1 and another circuit is completed from the negative terminal of circuit $A_2$ to telephone line No. 2. This applies a positive voltage to line No. 1 and a negative voltage to line No. 2.

Therefore, it may be seen that the voltage on the telephone lines is reversed when the meter goes from "high" to "low." A positive or negative pulse of two seconds duration is thus transmitted along the telephone line when a faulty circuit is sampled, since, as described, the winding of relay $K_1$ or of relay $K_2$ is energized for two seconds each time a fault occurs and each time the faulty circuit is sampled.

The telephone line including lines No. 1 and No. 2 connects the unattended broadcast transmitter station of Fig. 1$a$ (at which are located the four transmitter circuits which are to be sampled and in which abnormalities or faults are to be detected) to the remote or distant attended indicating station of Fig. 1$b$, at which the faults or abnormalities are to be indicated. Reference will now be made to Fig. 1$b$.

The device at the remote indicating location (Fig. 1$b$) which differentiates between voltages of opposite polarities on the telephone line (corresponding to "high" or "low" sampled-voltage values) is a polarized relay $K_6$. The fault-denoting two-second pulse transmitted along the telephone line moves the arm 37 of polarized relay $K_6$ to either the right or left, depending upon the relative polarity of the pulse. The arm of this relay moves to the right when there is a positive voltage on telephones line No. 1 and a negative voltage on telephone line No. 2, and moves to the left in response to a negative voltage on line No. 1 and a positive voltage on line No. 2. In other words, for "low" voltage it moves to the right and for "high" voltage to the left. The circuit to the winding of relay $K_6$ is completed through the normally-closed contacts of a microswitch or snap-action switch 23, which switch is a single-pole double-throw switch quite similar in design to that of switch 35 operated by cam 8 in Fig. 1$a$.

The synchronous timing motor $B_2$ at the remote point drives a timing shaft 24 to which are secured six cams 25, 26, 27, 28, 29 and 30. Timing motor $B_1$ at the transmitter location (Fig. 1$a$) operates all the time that switch $S_1$ is closed and 110 volts A. C. power is available. One of the features of the present system of fault reporting is that motor $B_2$ at the remote location (Fig. 1$b$) is always held in step with motor $B_1$. This is done by means of a synchronizing pulse which is transmitted every 90 seconds from the transmitter site to the remote site. The details of this synchronizing action will be described hereinafter.

There is a notch in each of the cams 25–30, the notches being denoted by $A_1$, $B_1$, $C_1$, $D_1$, $E_1$ and $E_2$, respectively. Notches $A_1$, $B_1$, $C_1$ and $D_1$ correspond in angular position, respectively, to notches A, B, C and D at the transmitter location of Fig. 1a. The shafts 3 (driven by motor $B_1$) and 24 (driven by motor $B_2$) are arranged to be rotated in isochronism or in step with each other. If in Fig. 1a the shaft 3 rotates in such direction that switches 9, 10, 11 and 12 are closed in that order, then the shaft 24 in Fig. 1b rotates in such direction that switches 31, 32, 33 and 34 are closed in that order. Furthermore, since the relative angular positions of notches $A_1$, $B_1$, $C_1$ and $D_1$ are the same as those of notches A, B, C and D, respectively, switches 9 and 31 are simultaneously closed, then at a later time switches 10 and 32 are simultaneously closed, then still later switches 11 and 33 are simultaneously closed, following which switches 12 and 34 are simultaneously closed. The circumferential lengths of notches $A_1$, $B_1$, $C_1$ and $D_1$ are such that, considered in connection with the speed of rotation of shaft 24, which is exactly the same as that of shaft 3, each of microswitches 31–34 is closed for six seconds, these switches being closed successively, in regular order. The time-length of notch $E_1$ is also six seconds, so that switch 23 is actuated for six seconds during each revolution of shaft 24. The time-length of notch $E_2$ is two seconds, so that switch 36 is actuated for two seconds during each revolution of shaft 24. Each notch permits the actuating lever of a microswitch or snap-action switch, which lever cooperates with a corresponding cam, to fall into the notch and operate the switch. Switch 31 is operated by notch $A_1$, switch 32 by notch $B_1$, switch 33 by notch $C_1$, switch 34 by notch $D_1$, switch 23 by notch $E_1$ and switch 36 by notch $E_2$. Although the actuating levers of switches 23 and 36 are shown as being on the opposite side of shaft 24 from the levers of switches 31–34, this has been done only for convenience in illustration. Actually, to make the system of this invention work properly, the actuating levers of all the switches 31, 32, 33, 34, 23 and 36 should be on the same side of shaft 24. Each of switches 31–34 carries two stationary contacts which are closed on their respective actuating or movable contacts when the corresponding microswitches are actuated. Each stationary contact is connected in a series circuit with a respective indicator lamp. The actuating arms of the four switches 31–34 are all connected to the bus $t$, which is energized from a 110-volt source of alternating current when power switch $S_2$ is closed. But $u$ serves as the opposite lead from the alternating current source when switch $S_2$ is closed.

When notch $A_1$ actuates the microswitch 31, indicator lamps $I_7$ and $I_8$ are connected to the 110-volt bus $t$. The arm of polarized relay $K_6$ controls a movable contact 37 which can cooperate with one of two fixed contacts 38 and 39 on opposite sides thereof. Movable contact 37 is connected to the alternating current bus $u$. When the arm 37 of relay $K_6$ moves to the right to contact 39, a connection is made between wires $u$ and $w$, contact 39 being connected to wire $w$. Now, if the arm 37 of $K_6$ moves to the right when microswitch 31 is actuated, an energizing circuit is completed to "low" lamp $I_7$ as follows: bus $t$, wire $bb$, actuating arm of switch 31, lower fixed contact of switch 31, lamp $I_7$, movable contact 40 of relay $K_{13}$ (now closed on its lefthand contact as illustrated), wire 11, wire $w$, arm 37, bus $u$. Lamp $I_7$ will then light.

When the arm 37 of relay $K_6$ moves to the left to contact 38, a connection is made between wires $u$ and $v$, contact 38 being connected to wire $v$. If this movement of the arm 37 of $K_6$ to the left occurs when microswitch 31 is actuated, an energizing circuit is completed to "high" lamp $I_8$ as follows: bus $t$, wire $bb$, actuating arm of switch 31, upper fixed contact of switch 31, lamp $I_8$, movable contact 41 of relay $K_{14}$ (now closed on its lefthand contact as illustrated), wire $hh$, wire $v$, arm 37, bus $u$. Lamp $I_8$ will then light.

Lamps $I_7$ and $I_8$ are the "low" and "high" indicators, respectively, for the circuit in Fig. 1a sampled by cam 4, that is, the line voltage circuit. Lamps $I_5$ and $I_6$ are the "low" and "high" indicators, respectively, for the second sampled circuit in Fig. 1a, that is, the transmitter high voltage circuit. Lamps $I_3$ and $I_4$ are the respective "low" and "high" indicators for the third sampled circuit, that is, the power amplifier anode current circuit. Lamps $I_1$ and $I_2$ are the respective "low" and "high" indicators for the fourth sampled circuit, that is, the antenna transmission line current circuit. The connections of lamps $I_1$–$I_6$ in pairs are exactly similar to those of lamps $I_7$ and $I_8$, previously described. The operation of these other pairs of lamp circuits is also similar to that of lamps $I_7$ and $I_8$, already described. If the arm of $K_6$ moves to the right when microswitch 32 is actuated, an energizing circuit is completed to lamp $I_5$ and this lamp lights; if the arm of $K_6$ moves to the left, an energizing circuit is completed to lamp $I_6$ and this lamp lights. With microswitch 33 actuated, if the arm of $K_6$ moves to the right, an energizing circuit is completed to lamp $I_3$ and this lamp lights; if the arm of $K_6$ moves to the left, lamp $I_4$ lights. With microswitch 34 is actuated, if the arm of $K_6$ moves to the right, an energizing circuit is completed to lamp $I_1$ and this lamp lights; if the arm of $K_6$ moves to the left, lamp $I_2$ lights.

For the purpose of following through the operation with an example, it will be assumed that motors $B_1$ and $B_2$ are in step, that microswitches 9 and 31 are both actuated (closed), and that the line voltage at the transmitter circuit is abnormal in such a direction ("low") that the arm of polarized relay $K_6$ moves to the right. Under these conditions, a connection is made between wires $u$ and $w$. Lamps $I_7$ will then light.

According to the fault indicating system of this invention, each annunciator lamp in Fig. 1b will stay lit, once it is illuminated, until it is extinguished by an attendant at the indicating station, after he has duly noted the nature of the fault at the distant transmitter. The circuit connections for bringing this about will now be described.

As soon as the energization circuit to lamp $I_7$ is completed, causing lamp $I_7$ to light, the winding of relay $K_{13}$, which is in parallel with said lamp, is also energized. When relay $K_{13}$ operates, it locks itself in, as well as locking in lamp $I_7$, from the 110-volt A. C. source by means of its contacts 40 and 42, through a circuit as follows: bus $t$, wire $cc$, contact 42 (now closed), winding of relay $K_{13}$ and/or lamp $I_7$, contact 40 (now connected to lead $mm$), lead $mm$, bus $u$. Thus, once "low" lamp $I_7$ is illuminated in response to a positive voltage on telephone line No. 1 (in turn in response to a "low" line voltage at the transmitter), it stays lit even though the microswitch 31 on cam 25 is closed for only four seconds (the time-length of notch $A_1$). Lamp $I_7$, or any and all lamps which are illuminated, may be extinguished by depressing or pushing switch $S_3$, which is in series in bus $u$, thus breaking the lock-in circuit for lamp $I_7$ and the coil of relay $K_{13}$.

When any one of the fault-indicating lamps is illuminated, buzzer $I_9$ is also energized, to alert the attendant at the remote location of Fig. 1b that a fault has occurred at the transmitter. Resistors $R_{13}$–$R_{20}$ inclusive are isolating resistors which prevent one indicating lamp circuit from triggering off another and which yet allow buzzer $I_9$ to operate if any one lamp is illuminated. One end of each of resistors $R_{13}$–$R_{20}$ is connected to a common lead $xx$ which is connected to one end of the winding of a relay $K_{15}$, which operates at 10 volts, A. C. The other end of the winding of relay $K_{15}$ is connected to the alternating current bus $t$. The remaining end of resistor $R_{20}$ is connected by wire $jj$ to that common terminal of lamp $I_8$ and relay winding $K_{14}$ opposite to those connected to microswitch 31. The remaining end of resistor $R_{19}$ is connected by wire $kk$ to that common terminal of lamp $I_7$ and relay winding $K_{13}$ opposite to those connected to switch 31. The remaining end of resistor $R_{18}$ is connected by wire $qq$ to that common terminal of lamp $I_6$ and and relay winding $K_{12}$ opposite to those connected to switch 32. The remaining end of resistor $R_{17}$ is connected by wire $rr$ to that common terminal of lamp $I_5$ and relay winding $K_{11}$ opposite to those connected to switch 32. The remaining end of resistor $R_{16}$ is connected to that common terminal of lamp $I_4$ and relay winding $K_{10}$ opposite to those connected to switch 33. The remaining end of resistor $R_{15}$ is connected to that common terminal of lamp $I_3$ and relay winding $K_9$ opposite to those connected to switch 33. The remaining end of resistor $R_{14}$ is connected to that common terminal of lamp $I_2$ and relay winding $K_8$ opposite to those connected to switch 34. Finally, the remaining end of resistor $R_{13}$ is connected to that common terminal of lamp $I_1$ and relay winding $K_7$ opposite to those connected to switch 34.

The buzzer transformer $T_3$ has a 110-volt primary and a 10-volt secondary. The closing of the normally-open contacts 43 of relay $K_{15}$ connects the primary of transformer $T_3$ across the 110-volt buses $t$ and $u$. Continuing with the example, the voltage drop across isolating resistor $R_{19}$, when relay $K_{13}$ has been energized and is subsequent sealed in, is 90 volts. Then, the circuit through the coil of buzzer actuating relay $K_{15}$ is as follows: bus $u$, buzzer and lamp release switch $S_3$, wire $mm$, contact 40 of relay $K_{13}$ (closed on $mm$ when relay $K_{13}$ is energized), wire $kk$, resistor $R_{19}$, coil of $K_{15}$, bus $t$. Thus, the buzzer $I_9$ is actuated and may be turned off by pressing switch $S_3$, which breaks the buzzer circuit as well as the lamp circuit.

The operation of the synchronizing pulse arrangement, which holds the two timing motors $B_1$ and $B_2$ in step, will now be explained. Since the motors may be operating from 110-volt A. C. sources whose frequencies are not actually exactly the same, it is imperative that some means be provided for holding the two motors in step. Notch E (on cam 8) on the timing motor shaft 3 initiates the synchronizing pulse. When the arm of microswitch 35 associated with notch E falls into said notch (this happens once every 90 seconds, since the speed of rotation of shaft 3 is ⅔ R. P. M.), relay $K_1$ is energized by way of bus 2, the normally-open (but now closed) contact of switch 35, the arm of the microswitch, wire $g$, coil of $K_1$, bus 1. The contacts 21 of relay $K_1$ then close, applying a positive voltage to telephone line No. 2 and a negative voltage to telephone line No. 1. The duration of this synchronizing pulse is four seconds, corresponding to the time-length of notch E. It will be noticed that during this operation the slow-operate heater relay $K_3$ does not operate, the circuit to its filament being opened by the opening of the normally-closed contact of microswitch 35 when the actuating arm of this switch drops into notch E. The synchronizing pulse described is provided every 90 seconds or once for each revolution of the shaft 3. Because it is not desired that relay $K_3$ operate every 90 seconds to actuate the recentering solenoid 18 of meter $M_1$, the circuit to the filament of relay $K_3$ is opened in the manner described during the sending of the synchronizing pulse.

The angular position of notch E on cam 8 is so arranged that it does not coincide with any of notches A, B, C or D. Therefore, the transmission of the synchronizing pulse is entirely independent of the circuit sampling which is effected by notches A, B, C and D. Also, the angular positions of notch $E_1$ on cam 29 and notch $E_2$ on cam 30 coincide with that of notch E on cam 8 (shaft 3), so that when the two shafts 3 and 24 are in step, notch $E_1$ actuates microswitch 23 and notch $E_2$ actuates microswitch 36 at the same time that notch E actuates microswitch 23. Microswitch 36 is normally closed.

When the synchronizing pulse is received at the remote location (Fig. 1b), note that the notch $E_1$ has actuated microswitch 23. This assumes for the moment that the two motors are in step. Actuation of switch 23 opens the circuit from telephone line No. 1 to the coil of polarized relay $K_6$, and connects this telephone line instead to the coil of D. C. relay $K_5$. The opening of the circuit to relay $K_6$ is necessary since otherwise relay $K_6$ would operate to actuate the buzzer momentarily every 90 seconds, even though no indicating lamp would be illuminated. For example, if the arm of relay $K_6$ moved to the left in response to the synchronizing pulse voltage (positive voltage on telephone line No. 2 and negative voltage on telephone line No. 1), a circuit such as follows would momentarily be completed to buzzer actuating relay $K_{15}$, even though switches 31–34 were all then open: bus $t$, winding of $K_{15}$, resistor $R_{20}$, wire $jj$, contact 41 (relay $K_{14}$ being unenergized and in the position shown), wire $hh$, wire $v$, contact 38, arm 37, bus $u$. The opening of the circuit to relay $K_6$ prevents operation of said relay and the completion of a circuit such as just described.

The normal energization circuit for motor $B_2$ (i. e., when no synchronizing pulse is being transmitted) is as follows: bus $u$, wire $x$, the normally-closed contact of switch 36, wire $z$, motor $B_2$, bus $t$. The synchronizing action is such that if the two motors get out of step so that notch E at the sending end (unattended transmitter) does not operate its microswitch 35 at the same time as the corresponding notches $E_1$ and $E_2$ at the remote point (attended indicating station) operate their microswitches 23 and 36, the motor $B_2$ will wait until motor $B_1$ catches up. This may be understood from the following description. When the microswitch 36 is actuated to open position by notch $E_2$, the circuit to motor $B_2$ is opened, and the motor stops. Motor $B_2$ will start only when a synchronizing pulse initiated by notch E at the transmitter is received to operate relay $K_5$, relay $K_5$ being connected across the telephone lines No. 1 and No. 2 at this time by the actuation of switch 23 by notch $E_1$, which is angularly aligned with notch $E_2$ (and the motor $B_2$ having now stopped). The synchronizing pulse (positive voltage on telephone line No. 2 and negative voltage on telephone line No. 1) then momentarily energizes relay $K_5$. This energization of relay $K_5$ will complete an energization circuit to motor $B_2$, as follows: bus $u$, wire $x$, the now-closed contacts 44 of relay $K_5$, wire $y$, motor $B_2$, bus $t$. Motor $B_2$ then starts up.

As soon as motor $B_2$ thus starts up, microswitch 36 is closed, the normal energization circuit to motor $B_2$ is restored and the two timing motors $B_1$ and $B_2$ rotate in step. Whereas the time-length of the notch E is four seconds, that of notch $E_2$ is only two seconds. This allows motor $B_2$ to be safely transferred to its normal energization circuit or path before the end of the synchronizing pulse (which pulse lasts for four seconds). If motor $B_2$ stops so that the arm of microswitch 36 is in the middle of the two-second notch $E_2$, then a four-second closing of relay $K_5$ (during the four-second synchronizing pulse) will provide a path of one second's duration to motor $B_2$ by way of wire $y$ and closed contact 44, and two paths, one by way of wire $y$ and closed contact 44 and the other by way of closed switch 36 and wire $z$, for the balance of three seconds.

The time-length of notch $E_1$ being six seconds, it comfortably overlaps notch E (whose time-length is four seconds) and, by operation of microswitch 23, definitely disconnects the polarized relay $K_6$ and connects the D. C. relay $K_5$ for reception of the four-second synchronizing pulse. This assumes that the two motors $B_1$ and $B_2$ are in step. The four-second synchronizing pulse (during which relay $K_5$ is energized if the two motors are in step) comfortably overlaps notch $E_2$, whose time-length is two seconds. This makes certain that the contact 44 will be closed (by relay $K_5$) to keep the circuit to motor $B_2$ closed (during the four-second synchronizing pulse) over a time interval which overlaps the two-second time-length of notch E₂, during which two seconds switch 36 is open and the normal energization circuit to motor B₂ is broken; thus, if the motors are in step, the circuit to motor B₂ is not broken and the two motors maintain their in-step relation.

If the frequencies of the two alternating current sources (for Figs. 1a and 1b, respectively) are slightly different, so that motor B₂ has to wait, say, once in every ten revolutions, then the effect is that no indicating of a fault will occur in this 90-second wait period, every ten revolutions. This does not impose too much of a limitation on the system, however, since the fault will be indicated as soon as the motors start again in step.

The two-second excess of notch E (time-length four seconds) over notch E₂ (time-length two second) allows the two motors to rotate together even though shaft 3 may be just less than two seconds behind (or ahead of) shaft 24. When this two-second difference in position is exceeded, motor B₂ will stop, as above described, and wait. Even though there may thus be up to a two-second displacement of the two timing shafts, there is no possibility that faulty operation of any of the circuits at the transmitter will illuminate any but the proper lamps at the remote point (the proper lamps being, for example, lamps I₇ and I₈ for the transmitter line voltage circuit), because notches A, B, C and D have an angular spacing with respect to each other of at least ten seconds.

The lengths of notches A₁, B₁, C₁ and D₁ are each six seconds, so that the lamp circuits associated with these notches are connected to bus t well in advance of any incoming two-second error or fault indicating pulse. It will be recalled that the winding of relay K₁ or of relay K₂ is energized for two seconds (thus transmitting a two-second voltage pulse) each time a fault occurs.

To summarize the action at the remote point (Fig. 1b), when a fault is indicated there, the attendant is summoned to the equipment by the sound of a buzzer. Assume that he finds lamp I₇ is lit. He makes note in his log book that line voltage is low. He then depresses release switch S₃, which causes the lamp to be extinguished and the buzzer to be deenergized, since the locking circuit set up for relay K₁₃ and for the lamp is then broken. If the fault is a momentary one that occurred over a period of less than 180 seconds, the fault will not be indicated the next time this circuit is sampled. If, however, there is a definite drop in line voltage at the transmitter, the buzzer will operate and the lamp I₇ will be lit 90 seconds later, on the next sampling of this circuit. The attendant may then arrange to dispatch a technician to the transmitter, to effect a correction of the faulty condition.

What is claimed is:

1. In a condition indicating system, a plurality of circuits to be checked, a comparator circuit including a source of reference voltage; means for successively sampling each of said circuits and for supplying to said comparator circuit a voltage from each sampled circuit for comparison with said reference voltage, said comparator circuit including also means responsive to a predetermined difference between any of said sampled circuit voltages and said reference voltage for transmitting to a remote monitoring point a voltage the polarity of which is related to the sense of said predetermined difference; means at said remote monitoring point operating in synchronism with said sampling means for successively completing a circuit to respective pairs of indicating devices one pair for each of said circuits, and means at said remote monitoring point responsive to the appearance of a voltage received thereat from said comparator circuit for causing energization of one or the other device of the pair of devices the circuit to which is then completed, the particular indicating device energized depending upon the polarity of the received voltage appearing at said remote monitoring point.

2. In a condition indicating system, a plurality of circuits to be checked, a comparator circuit including a source of reference voltage; means including a plurality of cams angularly displaced from each other and mounted on a common rotatable shaft, and respective switches operated thereby, for successively sampling each of said circuits and for supplying to said comparator circuit a voltage from each sampled circuit for comparison with said reference voltage; said comparator circuit including also means responsive to a predetermined difference between any of said sampled circuit voltages and said reference voltage for transmitting to a remote monitoring point a voltage the polarity of which is related to the sense of said predetermined difference; means at said remote monitoring point operating in synchronism with said sampling means for successively completing a circuit to respective pairs of indicating devices one pair for each of said circuits, and means at said remote monitoring point responsive to the appearance of a voltage received thereat from said comparator circuit for causing energization of one or the other device of the pair of devices the circuit to which is then completed, the particular indicating device energized depending upon the polarity of the received voltage appearing at said remote monitoring point.

3. In a fault detecting and indicating system, a plurality of circuits to be checked, means for successively sampling each of said circuits and for comparing a voltage in each sampled circuit with a reference voltage, means responsive to a predetermined difference between any of said sampled circuit voltages and said reference voltage for transmitting to a remote point a voltage a characteristic of which is related to the sense of said predetermined difference, said last-named means including a D. C. voltage source and a selectively-operable reversing switch arrangement coupled to said source, whereby the voltage transmitted to the remote point is D. C. voltage of one polarity for a sampled circuit voltage higher than the reference voltage and of the opposite polarity for a sampled circuit voltage lower than the reference voltage; means at said remote point operating in synchronism with said sampling means for successively completing a circuit to pairs of indicating devices one pair for each of said circuits, and means responsive to the appearance of a transmitted voltage at said remote point for causing energization of one or the other of the pair of indicating devices the circuit to which is then completed, the particular indicating device energized depending upon the characteristic of the transmitted voltage appearing at said remote point.

4. In a fault detecting and indicating system, a plurality of circuits to be checked, rotary switching means for successively and periodically sampling each of said circuits and for comparing a voltage in each sampled circuit with a reference voltage, means responsive to a predetermined difference between any of said sampled circuit voltages and said reference voltage for transmitting to a remote point by way of a pair of lines a voltage a characteristic of which is related to the sense of said predetermined difference, said last-named means including a D. C. voltage source and a selectively-operable reversing switch arrangement coupled to said source, whereby the voltage transmitted to the remote point is D. C. voltage of one polarity for a sampled circuit voltage higher than the reference voltage and of the opposite polarity for a sampled circuit voltage lower than the reference voltage; rotary switching means at said remote point operating in synchronism with said sampling means for successively and periodically completing a circuit to pairs of indicating devices one pair for each of said circuits, means responsive to the appearance of a transmitted voltage at said remote point for causing energization of one or the other of the pair of indicating devices the circuit to which is then completed, the particular indicating device energized depending upon the characteristic of the transmitted voltage appearing at said remote point, and means for maintaining the two rotary switching means in step with each other.

References Cited in the file of this patent

UNITED STATES PATENTS

| | | |
|---|---|---|
| 1,443,165 | Brown | Jan. 23, 1923 |
| 1,699,759 | Shepherd | Jan. 22, 1929 |
| 2,207,743 | Larson et al. | July 16, 1940 |
| 2,484,374 | Cahen et al. | Oct. 11, 1949 |
| 2,578,447 | Odell et al. | Dec. 11, 1951 |

FOREIGN PATENTS

| | | |
|---|---|---|
| 264,472 | Great Britain | Oct. 20, 1927 |
| 280,214 | Great Britain | May 2, 1929 |
| 562,264 | Germany | Oct. 24, 1932 |